ALVIN A. SNAPER
INVENTOR.

BY Allen E. Botney

ATTORNEY

United States Patent Office 3,376,135
Patented Apr. 2, 1968

3,376,135
NEGATIVE AND POSITIVE VIEW FROM A POLARIZED FILM STRUCTURE
Alvin A. Snaper, Burbank, Calif., assignor of twenty percent to Allen E. Botney, Van Nuys, Calif.
Filed Sept. 26, 1963, Ser. No. 311,883
7 Claims. (Cl. 96—27)

ABSTRACT OF THE DISCLOSURE

The present invention deals with photographic film whose opposite surfaces have been polarized in such a manner that it can be used to great advantage in the fields of film processing, information storage and retrieval, and data processing. One surface of the film is processed so that it will respond to one form of polarized light to present a negative image of the data recorded thereon and the other surface is processed so that it will respond to another form of polarized light to present a positive image of the same data.

---

The present invention relates in general to the photographic arts and more particularly relates both to a uniquely polarized film structure as well as to the process of manufacturing said structure.

Normally, when unprocessed film is exposed to a light image and then processed, a film negative is produced that records the image in the form of opaque and transparent areas. Generally speaking, the dark portions of the object being photographed produce transparent areas on the negative whereas the light portions produce the opaque areas. Thus, by way of example, if a document on which there is printing is photographed, the white background of the document will be recorded as an opaque area on the film negative whereas the dark printed matter thereof will turn out to be transparent. Again, where a map or engineering drawing is photographed, the image thusly recorded will result in transparent lines on an opaque background. In the examples presented, as well as in countless other instances that could be given, if a positive reproduction should be required it is necessary to incur the usual expense and expend the usual amount of time in going through the process of producing such a positive. It is thus seen that it would be a boon if the same piece of film could be used to selectively present either a positive or a negative of the image recorded thereon.

To be able to do this would be of very great advantage in a number of areas in the photographic field. For example, it would facilitate and expedite the reproduction of negatives, that is to say, in the making of negative copies since, by causing the film record to act as a positive instead of a negative, a further photograph of it would produce another negative copy. By doing so, the present intermediate steps of first producing a permanent positive from the original negative and of then photographing the positive to produce the duplicate negative would be eliminated. Again by way of example, it would be most helpful in the information storage and retrieval field wherein large amounts of data of one kind or another are stored on successive frames of a reel of film. Once a desired document is located, it could be presented as a film positive rather than as a negative, thereby making it very much easier for the viewer to read or otherwise examine. Again, in the event it is desired to photographically reproduce a duplicate of the original, the film element would be used in a negative state.

It is, therefore, an object of the present invention to provide a film structure that can be utilized either in a negative or in a positive state.

It is another object of the present invention to provide a film structure that can be utilized to selectively present positive and negative images of data photographically recorded thereon.

It is a further object of the present invention to provide a processed film structure that is normally a negative but which can selectively be converted to a positive.

It is an additional object of the present invention to provide a film structure which, when data is photographically recorded thereon and it is processed, can be used as a negative, as a positive, or both.

It is still another object of the present invention to provide a process for the manufacture of a film structure which can ultimately be employed either as a film negative, a positive, or both.

The above and other advantages as well as the above-stated objects can be achieved by means of the present invention and, in accordance with the basic concept thereof, this can be done by differently polarizing opposite surfaces of the filmed material. Stated differently, the essence of the invention lies in processing one surface of the filmed material so that it will respond to one form of polarized light to present a negative image of the data recorded thereon and in processing the other surface thereof so that it will respond to a second form of polarized light to present a positive image of the same data.

More particularly, according to a preferred embodiment of the invention, a film material is provided whose opposing surfaces have been differently pre-stressed. These surfaces are then dyed with a partciular dye solution, the combination of dye and stress acting to produce differently polarized surfaces, that is to say, the combination acts to cause one surface to pass light polarized only in one direction and acts to cause the other surface to pass light polarized only in another direction. The two surfaces are then respectively coated with two kinds of photosensitive resist material, the photo-resist material coating one surface being of the kind that is normally solvent soluble but that will become solvent insoluble when exposed to light and the photo-resist material coating the other surface being of the kind that is normally solvent insoluble but that will become solvent soluble when exposed to light. Following the deposition of the abovesaid photo-resist coatings, a transparency is placed over one of the coatings, namely, the coating that becomes solvent soluble on exposure to light, and light thereafter projected onto it. The exposed portions of this coating are then "washed" away with the appropriate solvent, the same solvent also "bleaching out" or "dissolving out" the dye crystals beneath, thereby leaving a first polarized and non-polarized pattern that corresponds to the image on the transparency.

The same film structure surface is then again exposed to light, the light passing through the film structure to the opposite surface thereof which, it will be remembered, is differently polarized. As a result, only that light that is initially incident upon the non-polarized portions of the top surface passes completely through to the second photo-resist coating and wherever this occurs, this second coating becomes solvent insoluble. Following this, the unexposed portions of the second photo-resist coating are then washed away, the solvent, as before, also bleaching or dissolving out the crystals of dye beneath. Hence, on this opposite surface of the film structure, there is produced a second polarized and non-polarized pattern, this second pattern being the positive or reverse of the first pattern. By projecting one type of polarized light against the film structure, the first pattern, that is, a negative image, appears whereas by projecting a second type of polarized light, the second pattern, that is, a positive image, appears. It is thus seen that a film structure has been produced that makes it possible to selectively present a negative and positive view of the same image.

The novel features which are believed to be characteristic of the invention, both as to its organization and method of operation, together with further objects and advantages thereof, will be better understood frm the following description considered in connection with the accompanying drawing in which an embodiment of the invention is illustrated by way of example. It is to be expressly understood, however, that the drawing is for the purpose of illustration and description only and is not intended as a definition of the limits of the invention.

Figure 1:
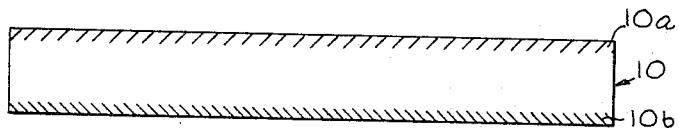
FIGURE 1 is a cross-sectional view illustrating a film structure having differently stressed surfaces.

Considering now the drawings, reference is made to FIG. 1 wherein a cross-section is shown of a sheet of photographic film 10 whose opposite surface layers 10a and 10b are differently stressed, that is to say, the two sides of the film have their optical "grain" running in different directions, at 90° to each other, one 45° to the left of vertical, the other 45° to the right of vertical. Stated differently, each surface of film structure 10 is composed of molecules which are oriented substantially parallel to one another and at 45° to the edges of the sheet, the orientation axes of the molecules on the two surfaces being at right angles to one another. This prestressed type of film is sold by the Polaroid Corporation, Boston, Mass., and further information about it may be obtained from an article by Edwin H. Land entitled "Vectographs: Images in Terms of Vectorial Inequality and Their Application in Three-Dimensional Representation," published in the Journal of the Optical Society of America, Vol. 30, No. 6, pages 230–238, June 1940 issue.

Figure 2:
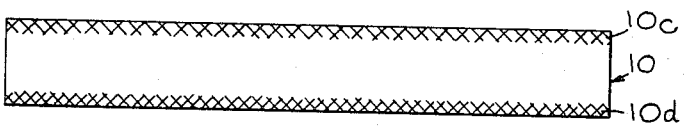
FIGURE 2 is a cross-sectional view illustrating the same film structure but with the stressed surfaces dyed to produce differently poralized surfaces.

The first step in the process is that of transforming surface layers 10a and 10b to cross-polarized layers so that only light of one polarization will pass through one of the layers and only light that is cross-polarized to the first will pass through the second of the layers. For this purpose, a material is applied to layers 10a and 10b, which, when absorbed by these layers, will combine with or coact with the aforementioned stresses in them to produce the desired cross-polarization effect. In general, any material may be used that will form crystalline polarizing layers when oriented by the directional stresses in the film 10 surface layers. Specifically, one such material is iodine in solution, with a small percentage of potassium iodide added to the solution to make the iodine more soluble in water. In using such a solution, the surfaces of film structure 10 are simply dyed with the solution until they become opaque to ordinary light and the solution may be applied in any convenient manner, such as by spraying it or brushing it on. The two cross-polarized surface layers are depicted in FIG. 2 wherein they are designated 10c and 10d.

Figure 3:
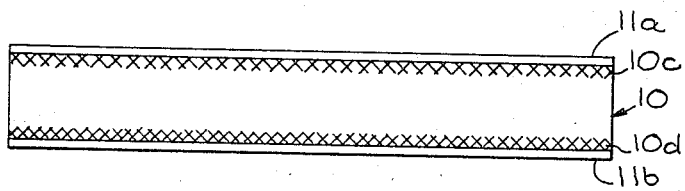
FIGURE 3 is a cross-sectional view that illustrates the FIG. 2 film structure once again, but with photo-resist layers coated over the polarized surfaces thereof.

Once the polarized layers are produced as described, they are respectively coated with two layers of a photosensitive resist material, the layer of resist material on one surface designated 11a in FIG. 3, being different than the layer of resist material, designated 11b, on the other surface. In other words, two different photo-sensitive resist materials are respectively deposited as layers 11a and 11b on polarized surface layers 10c and 10d. More specifically, layer 11a is made of a resist material which, after being applied to the film surface, is normally in a solvent insoluble state but which has the property of becoming solvent soluble wherever it is exposed to light. Resist layer 11b, on the other hand, is different in the sense that it is normally solvent soluble but, wherever exposed to light, it becomes solvent insoluble. Both resist layers are hard and dry after being applied.

The two kinds of resist materials mentioned above are well known and commercially available. Accordingly, detailed discussions of them are not deemed necessary here. Suffice it to say, therefore, that the photo-sensitive resist material of layer 11a, is manufactured and sold by the Master Sales and Service Corporation of Wyncote, Pa., and is sold by this company under the name of Azoplate Positop Photo-Resist. As for the photo-sensitive resist material of layer 11b, one such class of materials comprises those materials known as polyvinyl alcohols. The Kodak Corporation of Rochester, N.Y. manufactures and sells one such material, which is commercially known as Kodak Photo-Resist (KPR). Both the Kodak product as well as the Master Sales and Service product are used in the photo-etch process for making printed circuits and, therefore, as was previously mentioned, they are well known to those skilled in the art.

Figure 4:
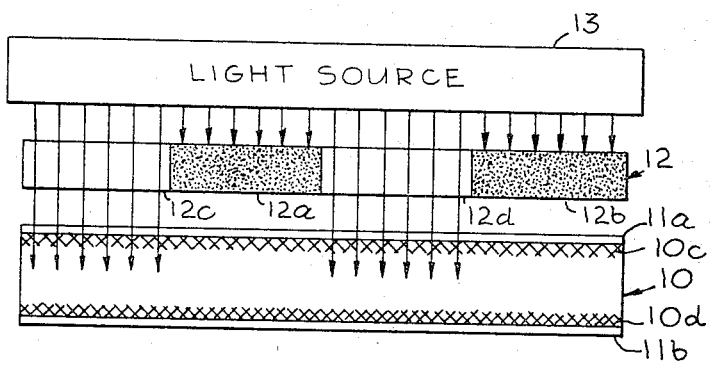
FIGURE 4 is a cross-sectional view that depicts the exposure of one of the surfaces of the FIG. 3 structure to actinic light through a transparency.

Following the deposition of layers 11a and 11b, a transparency 12 upon which an image of some sort is formed or recorded is positioned between layer 11a and a light source 13, as is shown in FIG. 4. Transparency 12 may be a frame of photographic film upon which an image is recorded in the form of opaque and transparent portions or it may, as a further example, be a thin sheet of metal that is impervious to light but that has a pattern cut out of it through which light may pass. In general, transparency 12 may be any member that will selectively prevent and permit light to pass through it. In the transparency shown in FIG. 4, the opaque portions of the transparency are designated 12a and 12b while the transparent portions thereof are designated 12c and 12d.

In view of what has been said, it will be recognized that when light source 13 is turned on, the light therefrom that is incident upon opaque transparency portions 12a and 12b will be prevented from passing through to layer 11a below but that the light incident upon transparent portions 12c and 12d will pass therethrough to the corresponding portions of layer 11a beneath. It will also be recognized that this light will also pass through layer 11a, polarized surface layer 10c and the body portion of film structure 10 to cross-polarized surface layer 10d. As a result, those portions of resist layer 11a that are directly beneath transparent portions 12c and 12d and, therefore, have been exposed to the light, are rendered solvent soluble. It should further be mentioned at this point that the light that has passed through transparent portions 12c and 12d became polarized in passing through polarized layer 10c which acts as a polarizer and, consequently, failed to pass through cross-polarized layer 10d. Accordingly, resist layer 11b thus far remains unaffected by this first projection of light.

Following the above-described exposure of resist layer 11a, film structure 10 is removed and its resist layer 11a thereafter washed with a solution in which the previously exposed portions of the layer are soluble. Alkaline solutions such as hydroxides of potassium, sodium or ammonia are examples of solutions that may be used in this step. With the removal of these soluble portions of layer 11a, those portions of polarized layer 10c that were therebeneath are exposed. The polarizing dye material therein, more specifically the oriented iodine crystals, are then removed from these corresponding portions of layer 10c, either by the same solvent solution that removed the soluble portions of layer 11a or with the aid of another appropriate solution, such as a potassium bromide solution.

Figure 5:
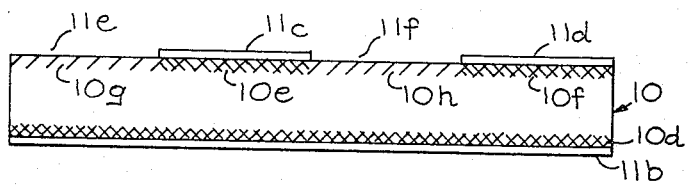
FIGURE 5 is a cross-sectional view that shows the FIG. 3 film structure with a polarized and non-polarized pattern already produced on one surface thereof.

When this has been done, the product thus far obtained is as illustrated in FIG. 5, to which reference is now made. As shown therein, portions 11c and 11d of resist layer 11a remain intact, these being those portions that were beneath opaque portions 12a and 12b of transparency 12 during the light exposure period. Similarly, portions 10e and 10f of polarized layer 10c, which were respectively shielded from the solvent solution by portions 11c and 11d, also remain. On the other hand, 11e and 11f represent washed away portions of resist layer 11a, these being those portions that were beneath transparent portions 12c and 12d of transparency 12 during the abovesaid exposure period. Similarly, 10g and 10h designate portions of layer 10c that were not shielded by the resist material. Accordingly, portions 10g and 10h are still stressed but no longer polarized. It will also be noted from the figure that cross-polarized layer 10d and resist layer 11b are still intact at this point.

Figure 6:
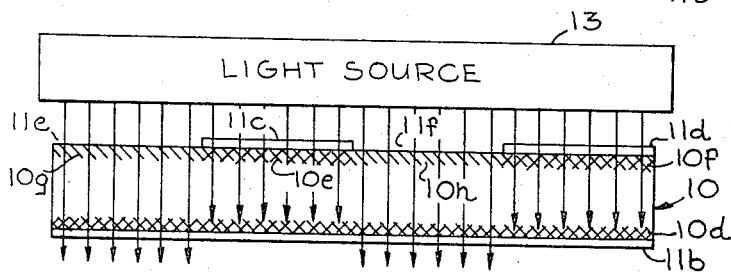
FIGURE 6 is a cross-sectional view that shows the FIG. 5 structure being subjected to a second exposure of light.

At this stage in the process, film structure 10 is placed once again beneath light source 13 in the manner shown in FIG. 6, namely, with layers 10d and 11b furthest away from the light source. When the light source is turned on, light therefrom passes through non-polarized portions 10g and 10h down through the film structure to the corresponding portions of resist layer 11b therebeneath. After due exposure, these corresponding portions of layer 11b are therefore rendered solvent insoluble. As for the remaining portions of resist layer 11b, these remaining portions remain solvent soluble due to the fact that cross-polarized regions are found above them so that the light cannot penetrate to these remaining portions of the resist layer. At the end of this second exposure period, film structure 10 is again removed from light source 13 for the purpose of washing away the still soluble portions of resist layer 11b and for the still further purpose of thereafter removing the polarizing dye material, namely, the iodine crystals in the regions therebeneath. To accomplish these purposes, layer 11b initially and layer 10d thereafter, are subjected to the appropriate solvent or solvents, as before. Trichloroethylene, liquid or vapor, may be used to wash away the soluble portions of this second resist layer and as mentioned earlier, a solution of potassium bromide can be used to remove the iodine crystals.

Figure 7:
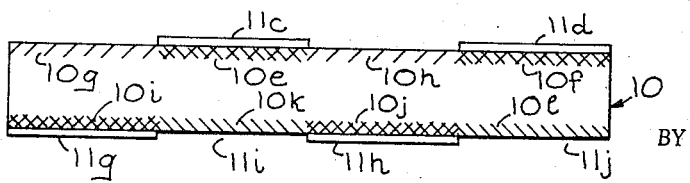
FIGURE 7 is a cross-sectional view of the same film structure, but with polarized and non-polarized patterns now on both surfaces thereof.

The final product obtained from the process previously delineated is shown in FIG. 7 wherein what was previously polarized surface layer 10d is reduced to polarized portions 10i and 10j as well as non-polarized portions 10k and 10l. Similarly, of resist layer 11b, only insoluble portions 11g and 11h remain, designations 11i and 11j indicating those portions that were washed away by the solvent. It is important to note from the figure that polarized portions or regions 10e and 10f on one surface are in exact registration with non-polarized portions or regions 10k and 10l on the other surface. Similarly, non-polarized portions or regions 10g and 10h on the first surface are in exact registration with polarized portions or regions 10i and 10j on the second surface. Thus, two patterns or images that are in exact registration are respectively recorded on the two surfaces of film structure 10, one such pattern or image, namely, the pattern or image comprising regions 10e–10h, being the reciprocal of the other pattern or image, namely, the pattern or image comprising regions 10i–10l. It is thus seen that by projecting one type of polarized light against the film structure, the negative image will come into view whereas by projecting cross-polarized light against the film structure, a positive image will come into view. Hence, by means of the present process, a film structure has been fabricated that makes it possible to selectively present negative and positive views of the same image.

From the process heretofore described, a film structure was produced which had an image recorded on each of its two surfaces. However, there may be times when an image may be required or desired on only one of the surfaces. On such occasions, it will be recognized that only a portion of the entire process need be employed, for example the steps required to produce image 10e–10h. If the second image should later be required, then the remaining steps in the process would be employed, namely, the steps required to produce image 10i–10l from image 10e–10h. Hence, a film structure having an image made up of polarized and non-polarized regions on only one of its surfaces and the process for producing such a single image film structure are also encompassed by the present invention.

Although a particular arrangement of the invention has been illustrated above by way of example, it is not intended that the invention be limited thereto. For example, in the preferred embodiment previously described, the film was described as having the optical "grain" on its two surfaces running in different directions, namely, at 90 degrees to each other, one 45 degrees to the left of vertical, the other 45 degrees to the right of vertical. This ultimately resulted, it will be remembered, in the use of cross-polarized light. However, the film surface layers can be pre-stressed so that their so-called "grain" still runs in different directions but either at greater or less than 90 degrees to each other. For example, the molecular or "grain" orientation in the stressed surface layers could be at 30 degrees to the left and right of vertical. This opens up some additional interesting possibilities since, with the aid of an analyzer which polarizes the light passing through it and which can be rotated, different output image effects can be obtained involving image density and contrast. Accordingly, the invention should be considered to include any and all modifications, alterations or equivalent arrangements falling within the scope of the annexed claims.

Having thus described the invention, what is claimed is:

1. Photographic film by means of which negative and positive views of a photographed image can selectively be produced, said film comprising: a transparent film structure having a first surface layer formed into a first polarized and non-polarized pattern and a second surface layer formed into a second polarized and non-polarized pattern, those regions of said first pattern that are polarized being polarized in a first direction and those regions of said second pattern that are polarized being polarized in a second direction, said second pattern being the positive of the first and having the polarized regions thereof arranged so that the negative view is obtained when light polarized in said first direction is directed against said film structure and the positive view is obtained when light polarized in said second direction is directed against said film structure.

2. The combination comprising: a photographic film structure whose opposite surface layers are differently polarized; and photo-sensitive resist layers respectively coated on said opposite surface layers, one of said resist layers being of a kind that is normally solvent soluble and becomes solvent insoluble when exposed to light and the other of said resist layers being of a kind that is normally solvent insoluble and becomes solvent soluble when exposed to light.

3. A process for recording positive and negative images of an object on photographic film whose opposite surfaces are differently polarized, said process comprising the steps of: coating one of said film surfaces with a layer of a first kind of photo-sensitive resist material that is normally solvent insoluble but which becomes solvent soluble upon exposure to light; coating the other of said film surfaces with a layer of a second kind of photo-sensitive resist material that is nomrally solvent soluble but which becomes solvent insoluble upon exposure to light; interposing a transparency on which an image of the object is recorded between said first kind of resist layer and a source of light, whereby those portions of said first kind of resist layer that are exposed to said light become solvent soluble; washing away said soluble portions with a solvent that also de-polarizes the film surface therebeneath, thereby leaving a first image of the object recorded on said one film surface as a polarized and non-polarized pattern; exposing said one film surface to light once again, the light passing through the film whereat said one surface is non-polarized striking said second kind of resist layer, whereby those portions of said second kind of resist layer that are exposed to said light become solvent insoluble; washing away the soluble portions of said second kind of resist layer with a solvent that also de-polarizes the film surface therebeneath, thereby leaving a second image of the object recorded on said other film surface as a polarized and non-polarized pattern, said first image being the negative and said second image being the positive thereof.

4. A process for recording positive and negative images of an object on photographic film whose opposite surfaces are differently stressed, said process comprising the steps of: applying a solution to both surfaces of the film of a kind that acts in combination with the stresses therein to respectively produce differently polarized surfaces; coating one of said film surfaces with a layer of a first kind of photo-sensitive resist material that is normally solvent insoluble but which becomes solvent soluble upon exposure to light; coating the other of said film surfaces with a layer of a second kind of photo-sensitive resist material that is normally solvent soluble but which becomes solvent in soluble on exposure to light; interposing a transparency on which an image of the object is recorded between said first kind of resist layer and a source of light, whereby those portions of said first kind of resist layer that are exposed to said light become solvent soluble; washing away said soluble portions with a solvent that also de-polarizes the film surface therebeneath, thereby leaving a first image of the object recorded on said one film surface as a polarized and non-polarized pattern; exposing said one film surface to light once again, the light passing through the film whereat said one surface is non-polarized striking said second kind of resist layer, whereby those portions of said second kind of resist layer that are exposed to said light become solvent insoluble; washing away the soluble portions of said second kind of resist layer with a solvent that also depolarizes the film surface therebeneath, thereby leaving a second image of the object recorded on said other film surface as a polarized and non-polarized pattern, said first image being the negative and said second image being the positive thereof.

5. The process defined in claim 4 wherein the solution applied to the film surfaces is an iodine solution.

6. The photographic combination comprising: a frame of photographic film on whose opposite surfaces are respectively recorded a pair of differently polarized images, the first of said film surfaces having a first area thereon wherein the first of said polarized images is recorded and the second of said film surfaces having a second area thereon wherein the second of said polarized images is recorded, the image in said first area including at least one region through which unpolarized light will pass and at least one region through which only light polarized in a first direction will pass, and the image in said second area including at least one region through which unpolarized light will pass and at least one region through which only light polarized in a second direction will pass, the unpolarized regions in each of said image areas being in registration with the polarized regions in the image area on the opposite side of said film.

7. The photographic combination comprising: a frame of photographic film on whose opposite surfaces are respectively recorded a pair of patterns having polarized and unpolarized regions within the borders thereof with the polarization of the polarized regions in the pattern on one surface being different from the polarization of the polarized regions in the pattern on the other surface, the polarized regions in the pattern on one surface respectively being identical in number and shape to and in registration with the unpolarized regions in the pattern on the opposite surface.

References Cited

UNITED STATES PATENTS

| | | | |
|---|---|---|---|
| 1,587,220 | 6/1926 | De Sperati. | |
| 2,179,786 | 11/1939 | Hardy | 96—5 |
| 2,397,276 | 3/1946 | Land | 96—40 |
| 2,416,510 | 2/1947 | Binda. | |
| 2,458,437 | 1/1949 | Smith | 96—5 |

NORMAN G. TORCHIN, *Primary Examiner.*

DONALD LEVY, *Assistant Examiner.*